US010668563B2

(12) United States Patent
Nagata et al.

(10) Patent No.: US 10,668,563 B2
(45) Date of Patent: Jun. 2, 2020

(54) LASER MACHINING APPARATUS

(71) Applicant: SUGINO MACHINE LIMITED, Uozu-shi, Toyama (JP)

(72) Inventors: Yukiaki Nagata, Kurobe (JP); Ryoji Muratsubaki, Uozu (JP); Masanori Kanemitsu, Uozu (JP); Masashi Tsunemoto, Uozu (JP)

(73) Assignee: SUGINO MACHINE LIMITED, Uozu-shi (JP)

( * ) Notice: Subject to any disclaimer, the term of this patent is extended or adjusted under 35 U.S.C. 154(b) by 0 days.

(21) Appl. No.: 16/030,140

(22) Filed: Jul. 9, 2018

(65) Prior Publication Data
US 2018/0311765 A1  Nov. 1, 2018

Related U.S. Application Data

(62) Division of application No. 13/476,677, filed on May 21, 2012.

(30) Foreign Application Priority Data

May 25, 2011  (JP) .................................. 2011-116692
Nov. 25, 2011  (JP) .................................. 2011-257232

(51) Int. Cl.
*B23K 26/146* (2014.01)
*B23K 26/16* (2006.01)

(52) U.S. Cl.
CPC ............ *B23K 26/146* (2015.10); *B23K 26/16* (2013.01)

(58) Field of Classification Search
CPC .. B23K 26/146; B23K 26/16; B23K 26/1435; B23K 26/1476
(Continued)

(56) References Cited

U.S. PATENT DOCUMENTS 3,503,804 A    3/1970  Schneider
4,125,757 A   11/1978  Ross
(Continued)

FOREIGN PATENT DOCUMENTS

JP         3680864 B2    8/2005
JP       2009-241119 A  10/2009
JP        2010221265 A  10/2010

OTHER PUBLICATIONS

Mar. 23, 2017 Office Action issued in U.S. Appl. No. 13/476,677.
(Continued)

*Primary Examiner* — Tu B Hoang
*Assistant Examiner* — Alba T Rosario-Aponte
(74) *Attorney, Agent, or Firm* — Oliff PLC

(57) ABSTRACT

A laser machining method, including: liquid supplying into a rectifying chamber; the rectifying chamber attenuating disturbances in flow of the liquid supplied; a liquid injecting into a liquid oscillating chamber exclusively from one direction from a liquid inlet port arranged on only one portion of a sidewall of the liquid oscillating chamber; the liquid jetting as a jet liquid column into air from a nozzle; a laser beam focusing on the axis of the nozzle and guiding to a machining point by the jet liquid column; a surface wave of the jet liquid column generating and gradually increasing in amplitude in the direction away from the nozzle; a body of the jet liquid column atomizing when the jet liquid column strikes the workpiece on the machining point.

1 Claim, 11 Drawing Sheets

(58) Field of Classification Search
USPC .............. 219/121.16, 121.67–121.7, 121.72, 219/121.84
See application file for complete search history.

(56) References Cited

U.S. PATENT DOCUMENTS

| | | | |
|---|---|---|---|
| 4,497,692 | A | 2/1985 | Gelchinski et al. |
| 4,689,467 | A | 8/1987 | Inoue |
| 4,766,009 | A | 8/1988 | Imura et al. |
| 4,952,771 | A | 8/1990 | Wrobel |
| 5,609,781 | A * | 3/1997 | Kaga .................... B23K 26/032 219/121.67 |
| 5,773,791 | A | 6/1998 | Kuykendal |
| 5,902,499 | A | 5/1999 | Richerzhagen |
| 7,705,266 | B2 * | 4/2010 | Koseki ................... B23K 26/02 219/121.67 |
| 2006/0102343 | A1 | 5/2006 | Skinner et al. |
| 2007/0119837 | A1 | 5/2007 | Nishiya et al. |
| 2008/0169275 | A1 | 7/2008 | Koseki et al. |
| 2009/0045177 | A1 * | 2/2009 | Koseki ............... B23K 26/0643 219/121.67 |
| 2009/0084765 | A1 * | 4/2009 | Muratsubaki ........ B23K 26/146 219/121.67 |
| 2010/0108648 | A1 * | 5/2010 | Koseki ............... B23K 26/0604 219/121.67 |
| 2010/0163539 | A1 | 7/2010 | Fukushima et al. |
| 2010/0226135 | A1 | 9/2010 | Chen |
| 2011/0042362 | A1 * | 2/2011 | Maehara .............. B23K 26/142 219/121.67 |

OTHER PUBLICATIONS

Jul. 27, 2017 Office Action issued in U.S. Appl. No. 13/476,677.
Jan. 26, 2018 Office Action issued in U.S. Appl. No. 15/360,321.
Feb. 8, 2018 Office Action issued in U.S. Appl. No. 13/476,677.
Jun. 4, 2018 Office Action issued in U.S. Appl. No. 15/360,321.
Aug. 23, 2016 Office Action issued in U.S. Appl. No. 13/476,677.
Feb. 19, 2016 Office Action issued in U.S. Appl. No. 13/476,677.
Aug. 31, 2015 Office Action issued in U.S. Appl. No. 13/476,677.
Mar. 10, 2015 Office Action issued in U.S. Appl. No. 13/476,677.
Dec. 28, 2018 Office Action issued in U.S. Appl. No. 15/360,321.
Nov. 23, 2018 Office Action issued in U.S. Appl. No. 13/476,677.

* cited by examiner

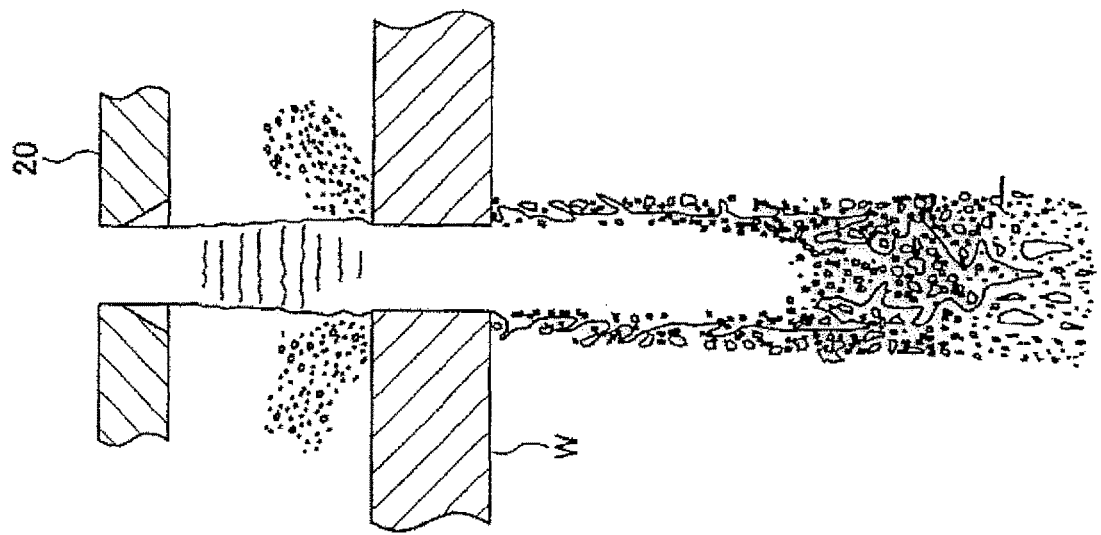
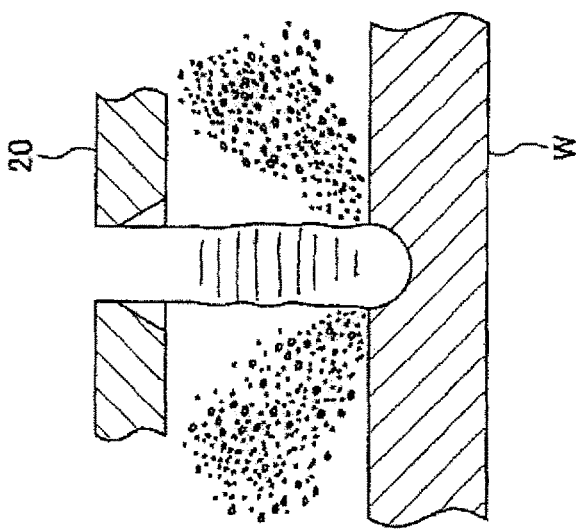
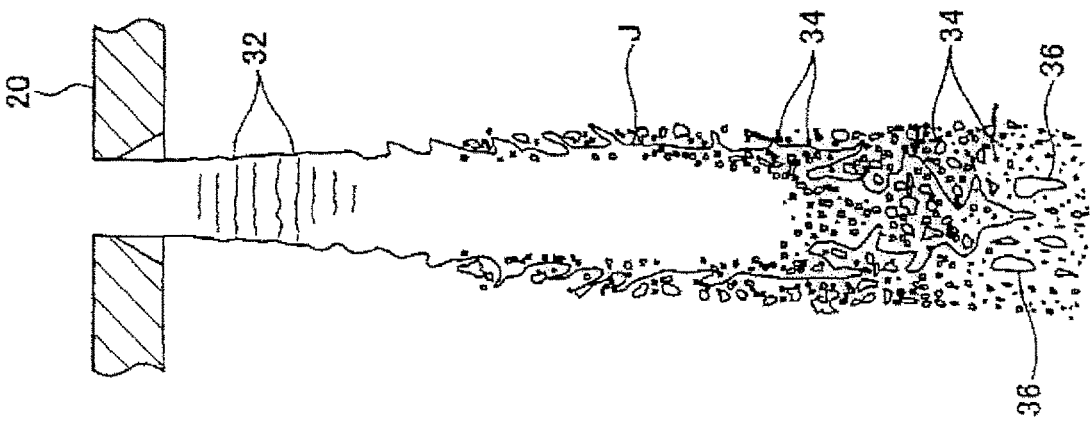

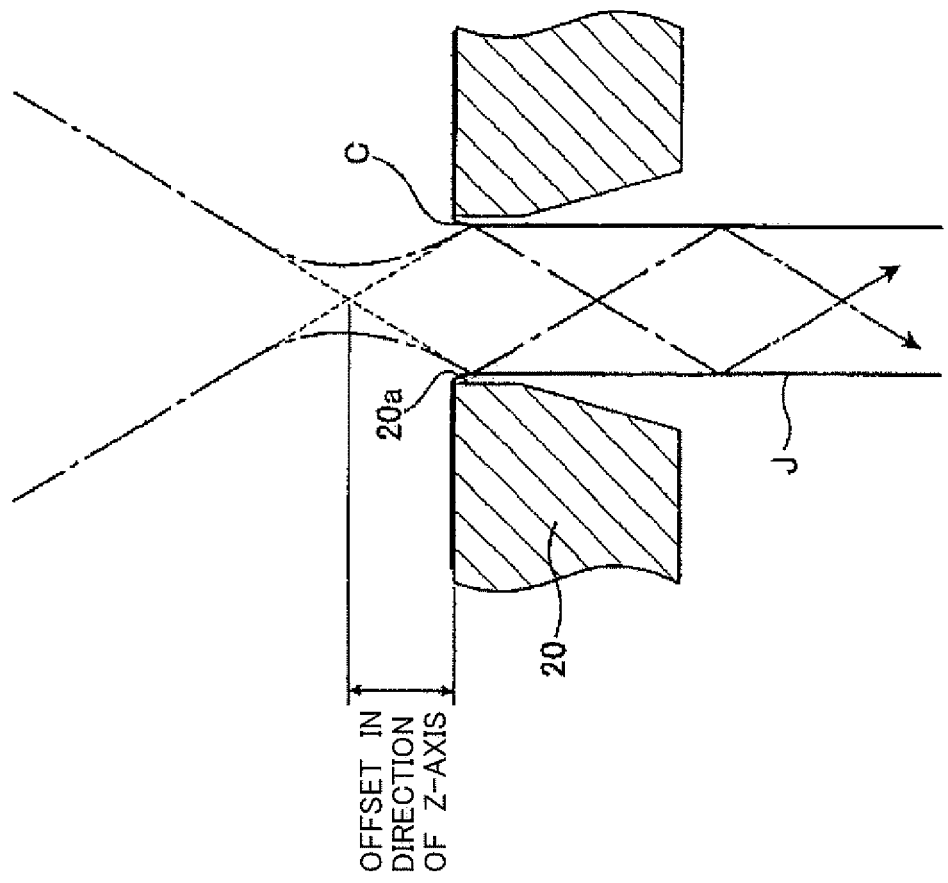
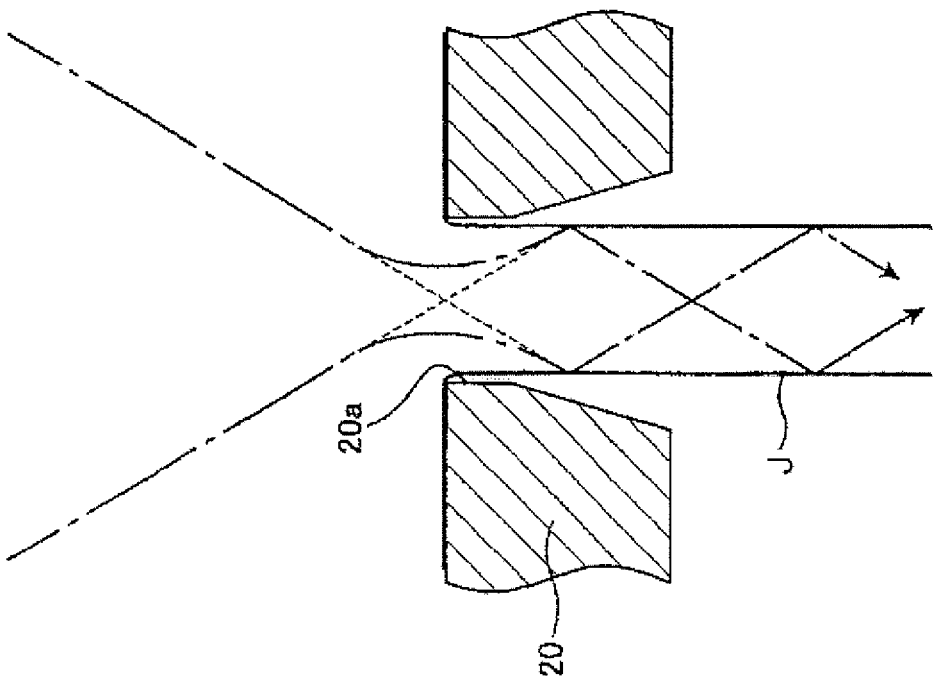

LASER MACHINING APPARATUS

This is a Divisional Application of U.S. application Ser. No. 13/476,677 filed May 21, 2012, which claims priority to JP 2011-257232 filed Nov. 25, 2011 and JP 2011-116692 filed May 25, 2011. The disclosures of the prior applications are hereby incorporated by reference herein in their entireties.

BACKGROUND

1. Technical Field

The present invention relates to a laser machining method and more particularly, to a laser machining method using a laser beam that is guided by a jet liquid column.

2. Related Art

Japanese Patent No. 3680864 discloses an apparatus for machining a material with a laser beam. In this apparatus, a liquid beam is jetted by a nozzle, and the laser beam is focused at an intake opening of the nozzle. Thus, the laser beam is guided by the liquid beam to reach a workpiece, so that the workpiece is machined.

Additionally, Japanese Published Unexamined Patent Application No. 2010-221265 discloses a laser machining apparatus. In this laser machining apparatus, a liquid is jetted from a nozzle, and a workpiece is machined by a laser beam that is introduced into a jet liquid column jetted from the nozzle. Also, a protective cover is disposed between the nozzle and the workpiece. The jetted liquid reaches the workpiece through a through-hole provided in the protective cover.

However, in the apparatus (the laser machining apparatus) disclosed in Japanese Patent No. 3680864, there is a problem in that, when the liquid beam (the jet liquid column) jetted to guide the laser beam strikes the workpiece, liquid is splashed back from the workpiece, and a mass of the splashed-back liquid strikes the jet liquid column, leading to disturbance in the jet liquid column. If a disturbance occurs in the jet liquid column, the laser beam that is guided while repeating total reflection within the jet liquid column becomes likely to leak out of the jet liquid column, causing a reduction in the laser guiding efficiency as well as the machining performance. Furthermore, in the case of cutting of a thick workpiece or deep hole drilling in a workpiece with the laser machining apparatus, since the machining cannot be completed in one scanning, the jet liquid column needs to be reciprocated several times in the same machining path. Especially in such a case, the influence of the splashed-back liquid increases.

On the other hand, in the laser machining apparatus disclosed in Japanese Published Unexamined Patent Application No. 2010-221265, the protective cover is provided for protecting the jet liquid column from the liquid that strikes the workpiece and is splashed back, thereby suppressing a reduction in laser guiding efficiency. However, also in this laser machining apparatus, there is a problem in that the splashed-back liquid strikes a portion of the jet liquid column in between the protective cover and the workpiece, leading to disturbance in the jet liquid column. There is also a problem in that, even if the jet liquid column is protected from droplets of the liquid splashed back from the workpiece, when the jetted liquid is accumulated on a surface of the workpiece to form a water layer, the accumulated liquid causes a reduction in light guiding efficiency. In other words, when a water layer is formed on the surface of the workpiece, the laser beam introduced by the jet liquid column might be scattered by the accumulated liquid or the light path of the laser beam might be changed by the influence of the water layer. Especially in the case of deep hole drilling with the laser machining apparatus, water is likely to be accumulated inside the hole during machining, and therefore the water layer exerts a great adverse influence.

SUMMARY

Accordingly, an object of the present invention is to provide a laser machining method which can efficiently machine a workpiece.

To address the above-mentioned problems, an aspect of the present invention provides a laser machining method using a laser beam that is guided to a machining point by a jet liquid column. The laser machining apparatus includes a nozzle, a rectifying chamber, a liquid oscillating chamber, a laser oscillator, a focusing optical system, and a window. The nozzle includes a nozzle inlet opening. The nozzle jets the jet liquid column. The rectifying chamber attenuates disturbances in flow of supplied liquid. The liquid oscillating chamber includes an oscillating chamber inlet port that allows inflow of the liquid from the rectifying chamber. The liquid oscillating chamber guides the inflowing liquid to the nozzle inlet opening. The laser oscillator generates a laser beam. The focusing optical system focuses the laser beam generated by the laser oscillator above the nozzle inlet opening to cause the jet liquid column to guide the laser beam. The window is opposed to the nozzle inlet opening to cause the laser beam exiting from the focusing optical system to enter the liquid oscillating chamber. The liquid oscillating chamber increases a surface wave on an outer surface of the jet liquid column to cause the jet liquid column jetted from the nozzle onto a workpiece to be easily atomized at the machining point.

According to the aspect of the present invention, supplied liquid flows into the rectifying chamber to be subjected to attenuation of flow disturbances. And then the liquid flows into the liquid oscillating chamber through the oscillating chamber inlet port. The liquid flowing in the liquid oscillating chamber passes through the nozzle inlet opening and is jetted, as the jet liquid column, from the nozzle. On the other hand, the laser beam generated by the laser oscillator passes through the window opposed to the nozzle inlet opening to enter the liquid oscillating chamber, and is focused above the nozzle inlet opening by the focusing optical system. Thus, the laser beam is guided by the jet liquid column. Also, the liquid oscillating chamber increases the surface wave on the outer surface of the jet liquid column, thereby causing the jet liquid column jetted from the nozzle onto the workpiece to be easily atomized at the machining point.

The jet liquid column, after reaching the workpiece, is immediately atomized, and therefore the disturbances given to the jet liquid column due to the liquid splashed back from the workpiece can be suppressed. Also, since the liquid is less likely to be accumulated in the machining point on the workpiece, interference with light guiding due to the accumulated liquid can be suppressed. This allows efficient machining of the workpiece.

In the aspect of the invention, preferably, the oscillating chamber inlet port is disposed such that the liquid flows in from one side of a sidewall of the liquid oscillating chamber surrounding the nozzle inlet opening. With this structure, an appropriate liquid flow is caused in the vicinity of the window, and consequently attachment of foreign material to the window due to the laser trapping phenomenon can be prevented.

In the aspect of the invention, preferably, the liquid oscillating chamber has a height in the range of about 20 to 300 times a diameter of the nozzle inlet opening, and a width in the range of about 15 to 200 times the diameter of the nozzle inlet opening. With this structure, the liquid oscillating chamber effectively oscillates the liquid and can form the sufficient surface wave on the jet liquid column. Therefore, the jet liquid column can be immediately atomized.

In the aspect of the invention, preferably, the rectifying chamber has an annular shape that surrounds at least a portion of the liquid oscillating chamber. This structure allows attenuation of the liquid flow in small space, thereby allowing a reduction in size of the laser machining apparatus.

In the aspect of the invention, preferably, the liquid oscillating chamber has a generally cylindrical shape with a height greater than its diameter. With this structure, the liquid oscillating chamber effectively oscillates the liquid and can form the sufficient surface wave on the jet liquid column. Therefore, the jet liquid column can be immediately atomized.

In the aspect of the invention, preferably, the liquid oscillating chamber is provided in the sidewall thereof with an air-bleeding hole separately from the oscillating chamber inlet port. With this structure, since the air-bleeding hole is provided on the opposite side of the oscillating chamber inlet port, accumulated air in the liquid oscillating chamber is forced out by the liquid flowing from the oscillating chamber inlet port, and thus the air can be quickly discharged.

In the aspect of the invention, preferably, the laser machining apparatus further includes a workpiece holder for holding the workpiece. The workpiece holder allows movement of the workpiece in a direction of an X-axis, movement of the workpiece in a direction of a Y-axis perpendicular to the X-axis, and rotation of the workpiece about respective axes parallel to the directions of the X- and Y-axes to be simultaneously performed, for flexible machining in three-dimensional space.

This structure allows the workpiece to move with a high degree of flexibility during machining, thereby allowing a very wide range of machining and an increase in machining accuracy. Also, accumulation of liquid in the vicinity of the machining point can be suppressed by moving the workpiece during machining.

In the aspect of the invention, preferably, the laser machining apparatus further includes a workpiece holder for holding the workpiece. The workpiece holder allows movement of the workpiece in a direction of an X-axis, movement of the workpiece in a direction of a Y-axis perpendicular to the X-axis, and rotation of the workpiece to be simultaneously performed, for flexible machining in three-dimensional space.

This structure allows the workpiece to move in the directions of the X- and Y-axes while rotating the workpiece during machining. Also, accumulation of liquid in the vicinity of the machining point can be further suppressed by rotating the workpiece at high speed during machining.

In the aspect of the invention, preferably, the focusing optical system focuses the laser beam toward the window with respect to the nozzle inlet opening for causing a portion of the laser beam to strike a flow contracting portion at which the jet liquid column is formed and further increasing the surface wave on the outer surface of the jet liquid column.

With this structure, a portion of the laser beam strikes the jet liquid column at the flow contracting portion in the vicinity of the nozzle inlet opening, thereby giving a disturbance to the jetted jet liquid column. This disturbance excites the surface wave on the jet liquid column and thereby allows a further increase in size of the surface wave, so that the jet liquid column after reaching the workpiece can be immediately atomized.

In the aspect of the invention, preferably, the laser machining apparatus further includes a mist jet injector for directing a mist jet on a workpiece surface to remove residues generated by machining. With this structure, machining dust generated by machining of the workpiece can be removed from the machining point, thereby allowing elimination of residues on the surface of the workpiece.

In the aspect of the invention, preferably, the laser machining apparatus further includes an oscillating chamber inlet path for guiding the liquid from the rectifying chamber to the oscillating chamber inlet port. The oscillating chamber inlet path guides the liquid along the window from one side of the liquid oscillating chamber to the oscillating chamber inlet port.

With this structure, since foreign material in the liquid can be washed out by the liquid flow along the window, attachment of foreign material to the window can be prevented.

In the aspect of the invention, preferably, the laser machining apparatus further includes an oscillating chamber inlet path adjusting member defining a form of the oscillating chamber inlet path. The surface wave on the outer surface of the jet liquid column is adjusted in size by changing the oscillating chamber inlet path adjusting member.

With this structure, the jet liquid column can be appropriately atomized depending on objects to be machined, thereby allowing machining of a wide range of objects to be machined with the laser machining apparatus of the present invention.

BRIEF DESCRIPTION OF THE DRAWINGS

Embodiments of the present invention will be described in detail based on the following drawings, wherein:

FIGS. 4A to 4C illustrate states of a jet liquid column jetted from a nozzle;

FIGS. 5A and 5B are enlarged views of a laser beam introduced into the jet liquid column through an inlet opening of the nozzle;

DETAILED DESCRIPTION

Next, referring to FIGS. 1 to 5B, a laser machining apparatus according to a first embodiment of the present invention will be described.

Figure 1:
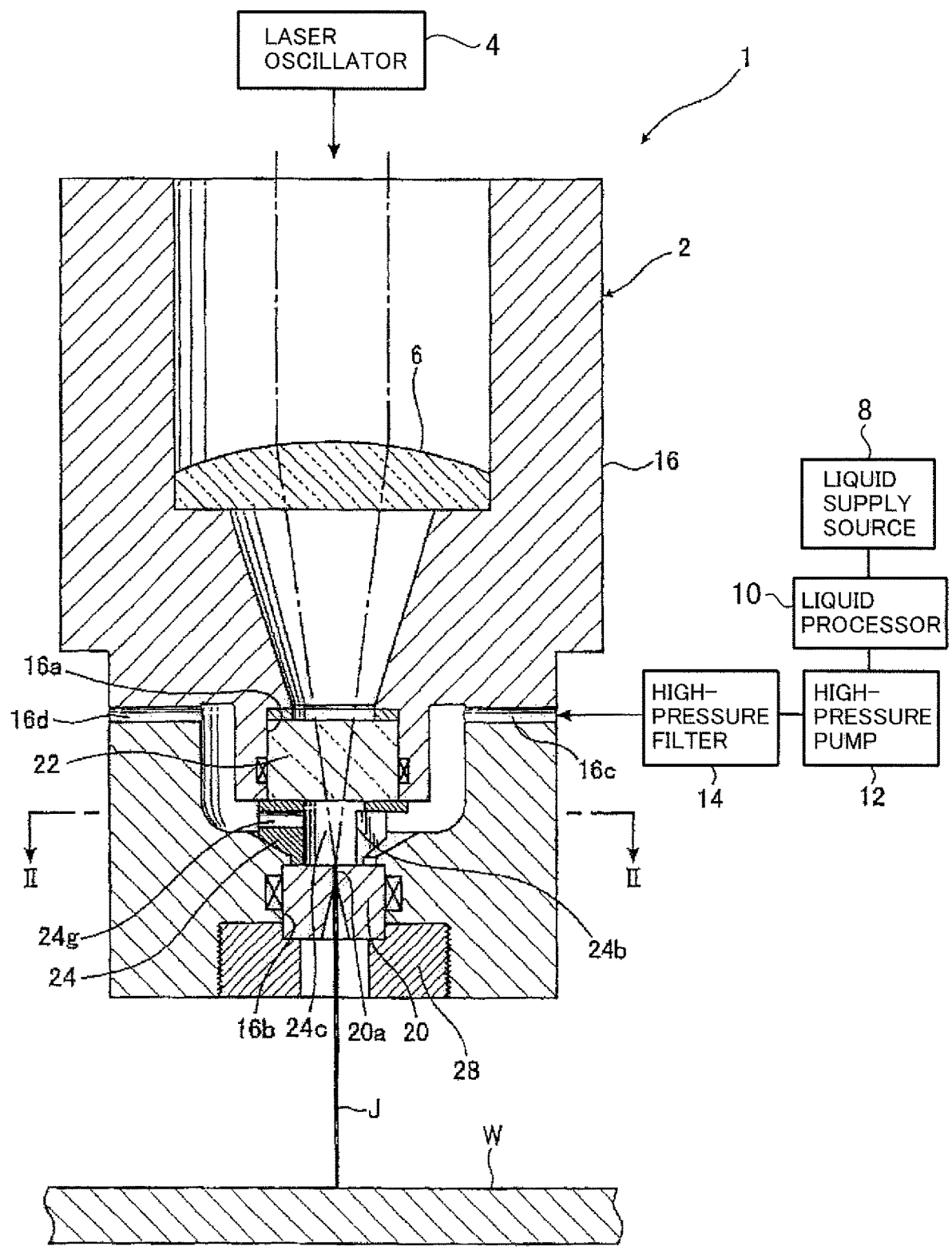
FIG. 1 is a sectional view of a head of a laser machining apparatus according to a first embodiment of the present invention.
Figure 2:
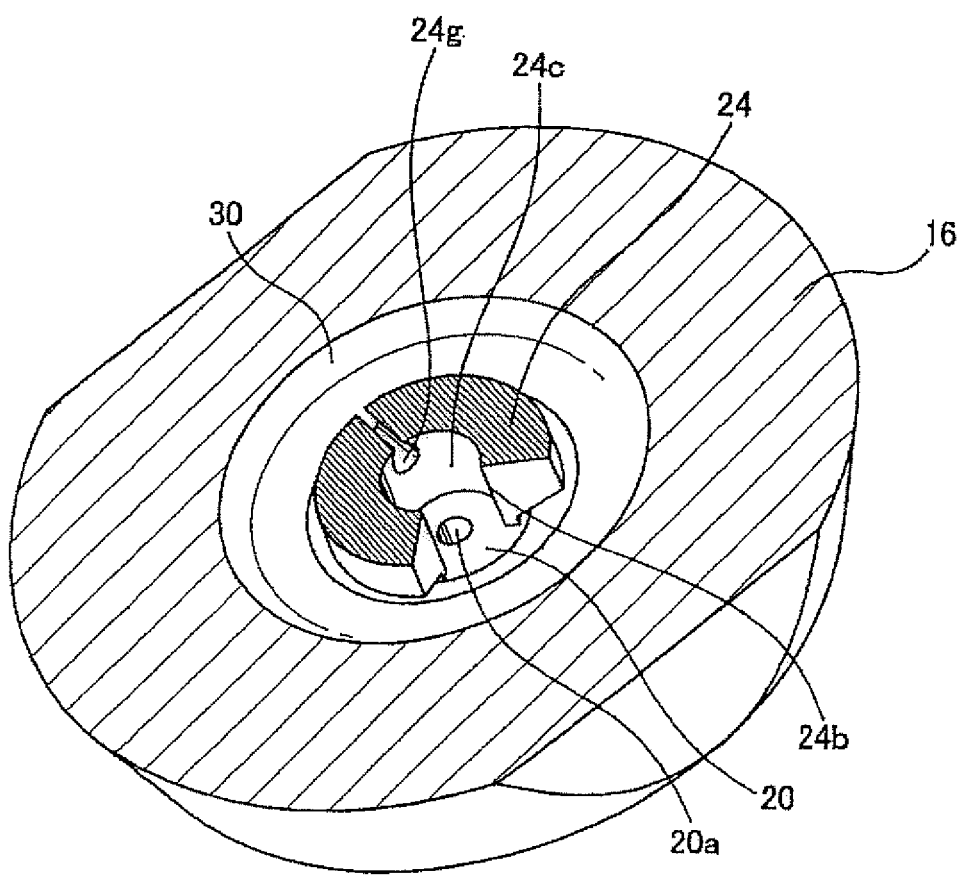
FIG. 2 is a perspective view illustrating a section taken along line II-II of FIG. 1.

As shown in FIG. 1, a laser machining apparatus 1 according to the first embodiment of the present invention has: a laser machining head 2; a laser oscillator 4 for transmitting a laser beam to the laser machining head 2; a focusing optical system 6 for focusing the laser beam transmitted from the laser oscillator 4; and a liquid supply source 8 for supplying water, serving as the liquid, to the laser machining head 2. Also, the liquid delivered from the liquid supply source 8 is supplied to the laser machining head 2 through a liquid processor 10, a high-pressure pump 12, and a high-pressure filter 14.

Furthermore, as shown in FIG. 1, the laser machining head 2 has a head body 16, a nozzle 20, a window 22, and a liquid oscillating chamber forming member 24. The laser oscillator 4 generates a laser beam having a predetermined strength. In this embodiment, a green laser is used as the laser beam; however, any kind of laser beam that is less absorbable by water may be arbitrarily selected.

A typical green laser is the second harmonic of a YAG laser fundamental wave (wavelength 1064 nm) and has a wavelength of 532 nm. Unlike the YAG laser fundamental wave (wavelength 1064 nm) and the $CO_2$ laser (wavelength 10.6 μm), the green laser has a property being less absorbable by water. Therefore, when water easily available at a cheaper cost is used as the jet liquid, the propagation efficiency of the laser can be increased.

The focusing optical system 6 focuses the laser beam generated by the laser oscillator 4 to a predetermined position. The laser beam emitted from the laser oscillator 4 is introduced into the laser machining head 2 through optical fibers or the like (not shown) and converted to a parallel beam by a collimating lens (not shown). And then the beam is focused on the axis of the nozzle 20 in the laser machining head 2 by a condensing lens. It should be noted that, in FIG. 1, only one condensing lens, which is a portion of the focusing optical system 6, is shown by reference sign "6" as the focusing optical system 6.

The liquid supply source 8 supplies water serving as the liquid to be jetted from the nozzle 20. The liquid processor 10 performs processing such as deionization of the liquid supplied from the liquid supply source 8. The high-pressure pump 12 pressurizes the liquid having undergone the liquid processor 10 and delivers the high-pressure liquid to the laser machining head 2. Also, the high-pressure filter 14 removes foreign material or the like from the liquid pressurized by the high-pressure pump 12. The water having undergone the high-pressure filter 14 is introduced into the laser machining head 2. It should be noted that, in this embodiment, water is pressurized to a pressure in the range of from 10 to 30 MPa by the high-pressure pump 12 to be introduced into the laser machining head 2.

The head body 16 is a shouldered, generally cylindrical member and allows the laser beam transmitted from the laser oscillator 4 to pass through the inside thereof. Also, the head body 16 is attached at its recessed shoulder with the condensing lens 6 so that the laser beam from the laser oscillator 4 is focused by the condensing lens 6. In addition, a cylindrical window receiving recess 16a for receiving the window 22 is formed within the head body 16, and the window 22 is disposed within the window receiving recess 16a. The laser exiting from the condensing lens 6 passes through the window 22 to be focused in the vicinity of an inlet opening of a nozzle hole.

The window 22 is a columnar member that allows a laser beam to pass through, and may be made of quartz, sapphire or the like. Also, a seal is disposed around the window 22 to ensure the water-tightness between the window receiving recess 16a and the window 22.

Also, the liquid oscillating chamber forming member 24 is disposed below the window 22. The liquid oscillating chamber forming member 24 is built in the head body 16. The window 22 is fixed in such a manner as to be held between the liquid oscillating chamber forming member 24 and the window receiving recess 16a (see FIG. 1).

A nozzle receiving recess 16b for receiving the nozzle 20 is formed at a lower portion of the head body 16, and the nozzle 20 is disposed within the nozzle receiving recess 16b. Internal threads are formed in the inner circumference of a lower end of the head body 16. The internal threads engage external threads that are formed in the outer circumference of a nozzle holding member 28, thereby fixing the nozzle 20 within the nozzle receiving recess 16b. Also, a seal is disposed around the nozzle 20 to ensure the water-tightness between the head body 16 and the nozzle 20.

Moreover, a liquid feed path 16c is formed in a side surface of the head body 16. The liquid feed path 16c is a substantially horizontally extending liquid path through from the outside to the inside of the head body 16. The liquid feed path 16c allows the liquid supplied from the liquid supply source 8 to flow into the laser machining head 2 through the liquid feed path 16c. The liquid flowing in through the liquid feed path 16c enters a generally annular space in the head body 16. The annular space attenuates disturbances in the liquid supplied from the liquid feed path 16c, and therefore serves as a rectifying chamber 30 (see FIG. 2). Furthermore, the liquid flows into a liquid oscillating chamber 24c from the rectifying chamber 30 through an oscillating chamber inlet port 24b.

Next, the nozzle 20 is a generally columnar member, and formed on its central axis with a nozzle hole 20a of circular cross section. The liquid in the liquid oscillating chamber 24c flows into the nozzle hole 20a through the nozzle inlet opening located at a top end of the nozzle hole 20a, and is jetted, as a jet liquid column J, from the nozzle 20. It should be noted that, in this embodiment, the diameter of the nozzle hole 20a (the nozzle inlet opening) is about 60 μm, however, may be arbitrarily changed depending on objects to be machined, etc.

Next, referring to FIGS. 3A to 3C, the structure of the liquid oscillating chamber forming member 24 will be described in detail. As shown in FIG. 3B, the liquid oscillating chamber forming member 24 is a generally cylindrical member, and disposed within the head body 16 so as to form on its outer side the rectifying chamber 30, and on its inner side the cylindrical liquid oscillating chamber 24c. In other words, the inner peripheral surface of the liquid oscillating chamber forming member 24 forms the sidewall of the liquid oscillating chamber 24c which surrounds the nozzle inlet opening. Also, the rectifying chamber 30 is formed as an annular space that surrounds the liquid oscillating chamber 24c around the liquid oscillating chamber forming member 24.

Figure 3A:
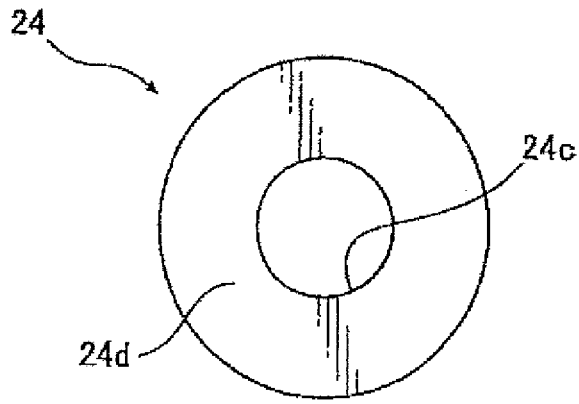
FIGS. 3A to 3C are top plan, sectional side, and bottom views, respectively, of a liquid oscillating chamber forming member.
Figure 3B:
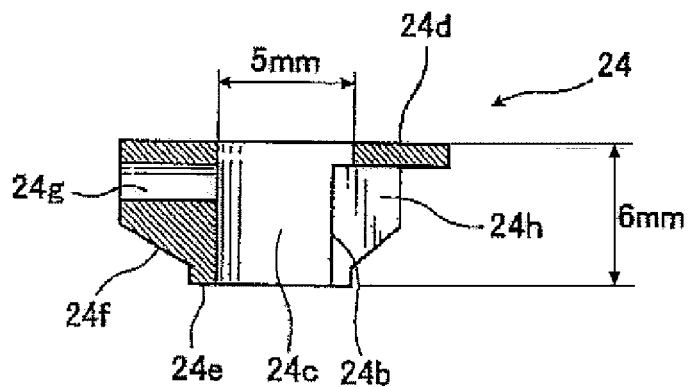

Also, as shown in FIGS. 3A and 3B, a window abutting surface 24d that abuts on the window 22 is formed at the top end of the liquid oscillating chamber forming member 24. With the window abutting surface 24d abutting on the lower end surface of the window 22, the window 22 is positioned.

Furthermore, a lower end surface 24e of the liquid oscillating chamber forming member 24 abuts on the top end surface of the nozzle 20, and an inclined surface 24f at a lower portion of the liquid oscillating chamber forming member 24 abuts on an inner wall surface of the head body 16. In this manner, with the window abutting surface 24d abutting on the window 22 and the lower end surface 24e abutting on the nozzle 20, the cylindrical liquid oscillating chamber 24c is defined by the lower end surface of the window 22, the top end surface of the nozzle 20, and the inner peripheral surface of the liquid oscillating chamber forming member 24. In this embodiment, the defined liquid oscillating chamber 24c is 6 mm in height and 5 mm in diameter, and is formed in a cylindrical shape having a height greater than the diameter. Preferably, the liquid oscillating chamber 24c has a height in the range of from 20 to 300 times the diameter of the nozzle hole (the nozzle inlet opening) and a diameter in the range of from 15 to 200 times the diameter of the nozzle hole (the nozzle inlet opening), the height of the liquid oscillating chamber 24c being set to be greater than the width.

Figure 3C:
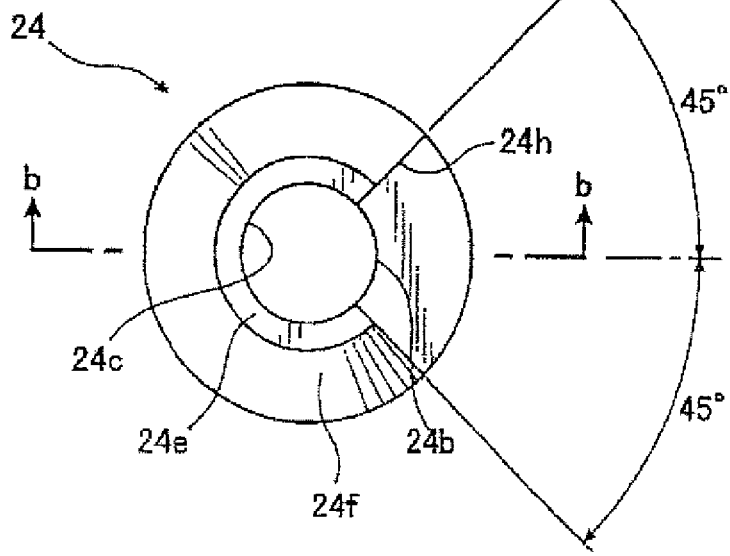

Furthermore, as shown in FIG. 3C, the sidewall of the liquid oscillating chamber forming member 24 is provided with a notch with a central angle of approximately 90°. The notch allows communication between the outer peripheral side and inside of the liquid oscillating chamber forming member 24, and therefore serves as an oscillating chamber inlet path 24h and the oscillating chamber inlet port 24b which allow communication between the rectifying chamber 30 and the liquid oscillating chamber 24c. More specifically, the oscillating chamber inlet path 24h is a path that is tapered from the rectifying chamber 30 to the liquid oscillating chamber 24c, and the oscillating chamber inlet port 24b is an opening for connection between the oscillating chamber inlet path 24h provided in the sidewall of the liquid oscillating chamber 24c and the liquid oscillating chamber 24c. Thus, the supplied liquid flows through the oscillating chamber inlet path 24h from the rectifying chamber 30 and enters the liquid oscillating chamber 24c through the oscillating chamber inlet port 24b. In this manner, liquid flows into the liquid oscillating chamber 24c from one side of the sidewall of the liquid oscillating chamber 24c.

Also, as shown in FIG. 3B, the liquid oscillating chamber forming member 24 is formed at a sidewall thereof with an air-bleeding hole 24g through from the liquid oscillating chamber 24c to an outer peripheral surface of the liquid oscillating chamber forming member 24, separately from the oscillating chamber inlet port 24b. The air-bleeding hole 24g is a small hole with circular cross section having a cross-sectional area smaller than the oscillating chamber inlet port 24b, and opposed to the oscillating chamber inlet port 24b. During operation of the laser machining apparatus 1, all of the liquid in the rectifying chamber 30 flows into the liquid oscillating chamber 24c through the oscillating chamber inlet port 24b because the air-bleeding hole 24g is increased in flow resistance.

Next, referring additionally to FIGS. 4A to 5B, the operation of the laser machining apparatus 1 according to the first embodiment of the present invention will be described. Upon start-up of the laser machining apparatus 1, firstly, the high-pressure pump 12 is activated. Thus, liquid is supplied to the high-pressure pump 12 from the liquid supply source 8 through the liquid processor 10. The liquid pressurized by the high-pressure pump 12 is fed into the liquid feed path 16c through the high-pressure filter 14. The liquid having flowed into the laser machining head 2 through the liquid feed path 16c passes through the rectifying chamber 30 and flows into the liquid oscillating chamber 24c through the oscillating chamber inlet port 24b. Here, at the time of startup of the laser machining apparatus 1, accumulated air in the liquid oscillating chamber 24c is discharged to the outside of the liquid oscillating chamber 24c through the air-bleeding hole 24g opposed to the oscillating chamber inlet port 24b. The air discharged out of the liquid oscillating chamber 24c is discharged to the outside of the laser machining head 2 through an air-bleeding path 16d (see FIG. 1). The air-bleeding path 16d is connected to a valve (not shown). When the valve is closed after discharge of air to the outside, the liquid oscillating chamber 24c, the rectifying chamber 30 and the like are filled with liquid. All of the liquid introduced from the liquid feed path 16c is jetted, as the jet liquid column J, from the nozzle hole 20a. In this state, the liquid in the rectifying chamber 30 flows into the liquid oscillating chamber 24c exclusively from one direction (i.e., the oscillating chamber inlet port 24b) to be jetted through the nozzle hole 20a. The liquid, after being rectified in the rectifying chamber 30, flows into the liquid oscillating chamber 24c from one direction and is oscillated, so that an appropriate disturbance is given to the liquid flow.

Next, the laser oscillator 4 is activated to generate a laser beam. The generated laser beam is condensed by the condensing lens 6 and passes through the window 22 to be focused on the central axis above the nozzle hole 20a (the nozzle inlet opening) within the liquid oscillating chamber 24c. The focused laser beam enters the inside of the jet liquid column J jetted from the nozzle hole 20a and is guided while repeating total reflection within the jet liquid column J to reach a workpiece W. The laser beam having reached the workpiece W machines the workpiece W.

FIGS. 4A to 4C illustrate in schematic form the states of the jet liquid column J jetted from the nozzle 20, wherein FIG. 4A illustrates a state of the jet liquid column J jetted into the air. FIGS. 4B and 4C illustrate states in which the jet liquid column J strikes the workpiece W to machine the workpiece W, wherein FIG. 4B illustrates a state in the process of cutting the workpiece W, and FIG. 4C illustrates a state of the jet liquid column J passing through the workpiece W. As shown in FIG. 4A, the liquid jetted from the nozzle 20 is jetted with a surface wave 32 formed on an outer surface of the jetted liquid column J. The surface wave 32 gradually increases in amplitude in the direction away from the nozzle 20, and finally, the liquid on a liquid column surface is partially separated, as droplets 34, from the liquid column J. Furthermore, the droplets 34 separated from the liquid column J increase gradually in number in the direction away from the nozzle 20, and finally, a body of the liquid column J is also separated into liquid masses 36 larger than the droplets 34, so that the liquid column J disappears.

To guide a laser beam with the jet liquid column J, it is necessary to cause the jet liquid column J to reach the workpiece W with almost no droplets 34 generated so that the laser beam is totally reflected within the jet liquid column J. Therefore, as for the laser-guiding function, preferably, the jet liquid column J reaches the workpiece W with the surface wave 32 small and no droplets 34 generated. However, actually, when the jet liquid column J reaches the workpiece W with the surface wave 32 small, the liquid splashed back from the workpiece W gives a disturbance to the jet liquid column J, rather, resulting in interference with light guiding. In particular, in the case of the workpiece W requiring multiple scanning of the jet liquid column J in order for the completion of cutting, the influence of the disturbance due to the liquid splashed back from the workpiece W is increased. In other words, in the case of cutting with multiple scanning, machining is performed in the state in which the machining point on the workpiece W is not pierced. Therefore, jetted liquid is not discharged downwardly of the workpiece W, and consequently, all of the jetted liquid is splashed back to the jet liquid column J, thereby giving a disturbance to the jet liquid column J.

Here, the laser machining apparatus 1 of this embodiment is constructed such that the jet liquid column J strikes the workpiece W after the surface wave 32 of the jet liquid column J jetted from the nozzle 20 has become larger to some extent. For this reason, as shown in FIG. 4B, when the jet liquid column J strikes the workpiece W, the splashed-back water is atomized, thereby hardly affecting the jet liquid column J even in the state in which the machining point is not pierced. Also, as shown in FIG. 4C, in the state in which the machining point is pierced, most of the jetted liquid is discharged downwardly of the workpiece W, thereby further reducing the influence of the splashed-back water.

In the laser machining apparatus 1 of this embodiment, liquid is allowed to flow into the nozzle hole 20a through the liquid oscillating chamber 24c, thereby giving an appropriate disturbance to the liquid flow. Thus, an appropriate surface wave is excited on the surface of the jet liquid column J jetted from the nozzle 20. The surface wave 32 grows to an appropriate size before reaching the vicinity of the workpiece W. In this manner, when the jet liquid column J strikes the workpiece W after the surface wave 32 has grown to an appropriate size, the jet liquid column J is immediately atomized, and therefore a disturbance is less likely to be given to the jet liquid column J. Also, when the jet liquid column J is atomized, the jetted liquid is immediately dispersed from the vicinity of the machining point on the workpiece W. Therefore, liquid is less likely to be accumulated in the vicinity of the machining point, so that interference with light guiding due to the accumulated liquid is suppressed. On the other hand, in the related art laser machining apparatus in which the jet liquid column J strikes the workpiece W with the surface wave 32 small, the liquid having struck the workpiece W is likely to be accumulated in the vicinity of a machining point on the workpiece W, the accumulated liquid interfering with laser guiding. Compared with this, in the laser machining apparatus 1 of this embodiment, even in the case of deep hole formation, since the liquid atomized at the machining point rises easily from inside a hole during machining, the liquid accumulated inside the hole is reduced.

In the laser machining apparatus 1 according to this embodiment, after liquid flow disturbances have been attenuated in the rectifying chamber 30, the liquid is introduced into the liquid oscillating chamber 24c, and the jet liquid column J is jetted therefrom through the nozzle 20. Thus, the appropriate surface wave is given to the jetted jet liquid column J, and thus the liquid is atomized immediately after the jet liquid column J strikes the workpiece W. It should be noted that, in the laser machining apparatus 1 of this embodiment, the distance between the lower end surface of the nozzle 20 and the workpiece W is set to be in the range of about 5 to 40 mm, thereby allowing efficient guiding of the laser beam to the workpiece W and atomizing the jet liquid column J having struck the workpiece W, so that favorable machining can be performed.

Next, referring to FIGS. 5A and 5B, introduction of the laser beam into the jet liquid column J will be described. FIG. 5A illustrates the state where a laser beam is introduced into the jet liquid column J in a general apparatus for guiding the laser beam with the jet liquid column J. FIG. 5B illustrates the state where a laser beam is introduced into the jet liquid column J in the laser machining apparatus 1 of this embodiment.

As shown in FIGS. 5A and 5B, liquid flows into the nozzle hole 20a through the nozzle inlet opening located at the top end surface of the nozzle 20 to be jetted as the jet liquid column J. Here, contraction flow occurs when the liquid flows into the nozzle inlet opening. Thus, the diameter of the jetted jet liquid column J becomes slightly smaller than that of the nozzle inlet opening.

As shown in FIG. 5A, in general apparatuses, the laser beam is focused at the center point of the circle of the nozzle inlet opening. The laser beam, expanding downward from the focusing point, strikes the boundary surface between the jet liquid column J and outside air, and then is guided while repeating total reflection within the jet liquid column J. On the other hand, in the laser machining apparatus 1 of this embodiment, the laser beam is focused above the nozzle inlet opening, that is, toward the window 22 with respect to the nozzle inlet opening. The laser beam focused above the nozzle inlet opening expands downward and strikes the jet liquid column J at a flow contracting portion C in the vicinity of the nozzle inlet opening, and then is guided while repeating total reflection within the jet liquid column J. In this manner, the laser beam gives a disturbance to the jetted jet liquid column J by causing the laser beam to strike the vicinity of the flow contracting portion C at which the jet liquid column J is formed. This disturbance excites the surface wave 32 on the jet liquid column J, and thereby allows a further increase in size of the surface wave 32, so that the liquid can be immediately atomized after the jet liquid column J has reached the workpiece W.

Also, in the related art laser machining apparatus, purified water is used as the liquid, and the liquid is pressurized by a high-pressure pump and then supplied through a high-pressure filter. However, there has been a problem in that slight dirt and oil eluted from the pump, pipes and the like by purified water collect on a window and are attached to a surface of the window. This is due to the optical tweezers principle (also called the laser trapping phenomenon) in which, when a strong laser beam passes through the window, dirt, oil, etc. in the water adjacent to the window are attracted to the window surface by the strong laser beam. In particular, the related art laser machining apparatus is constructed such that liquid flows axisymmetrically toward the center from the periphery of a liquid accumulation chamber that is provided for supplying liquid to the nozzle. Therefore, a stagnation point occurs in the center of the liquid accumulation chamber, the liquid flow speed in the vicinity thereof is greatly reduced. For this reason, dirt, oil, etc. in the water in the vicinity of the window surface are attracted and attached to the window.

On the other hand, with the laser machining apparatus 1 of this embodiment, since liquid flows into the liquid oscillating chamber 24c from one direction, liquid flows at a certain constant speed over the whole surface of the window 22. Thus, dirt, oil, etc. in the water are less likely to be attached to the window 22. Even if dirt, oil, etc. are attached to the window 22, they are immediately washed out by newly supplied liquid, and therefore attachment of impurities in the liquid to the window 22 can be suppressed.

Next, referring to FIGS. 6A and 6B, a laser machining apparatus according to a second embodiment of the present invention will be described. The laser machining apparatus of this embodiment differs from that of the above-described first embodiment in the shape of a liquid oscillating chamber forming member. Therefore, only the differences between these embodiments will be described hereinafter, and the description of the same construction, operation, and advantages will not be repeated.

Figure 6A:
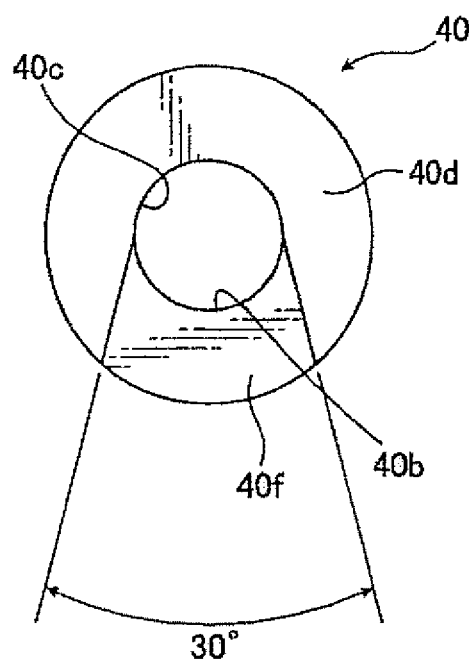
FIGS. 6A and 6B are top plan and front views, respectively, of a liquid oscillating chamber forming member incorporated in a laser machining apparatus according to a second embodiment of the present invention.
Figure 6B:
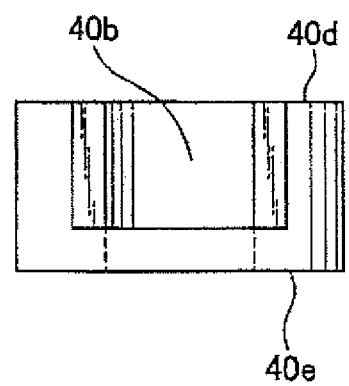

As shown in FIGS. 6A and 6B, a liquid oscillating chamber forming member 40 in this embodiment is formed in a generally cylindrical shape with an outside diameter of 8 mm, an inside diameter of 3.5 mm, and a height of 4 mm. Also, the liquid oscillating chamber forming member 40 is disposed with a top end surface 40d thereof abutting on the lower end surface of the window 22 and a lower end surface 40e abutting on the top end surface of the nozzle 20. Consequently, a liquid oscillating chamber 40c defined by the liquid oscillating chamber forming member 40 is of a columnar shape with a diameter of 3.5 mm and a height of 4 mm. Also, the generally cylindrical liquid oscillating chamber forming member 40 is partially provided with a notch. The notch forms an oscillating chamber inlet path 40f and an oscillating chamber inlet port 40b. The oscillating chamber inlet path 40f and the oscillating chamber inlet port 40b are each 3 mm in height, the top end surfaces thereof being defined by the lower end surface of the window 22. Also, the oscillating chamber inlet path 40f is tapered in width with a taper angle of 30° from the outer periphery to the inner periphery, and connected to the liquid oscillating chamber 40c through the innermost oscillating chamber inlet port 40b. Also, the width of the oscillating chamber inlet port 40b is the same as the diameter of the liquid oscillating chamber 40c, that is, 3.5 mm.

In the second embodiment constructed in this manner, the liquid oscillating chamber 40c is small, and liquid in the rectifying chamber 30 flows into the liquid oscillating chamber 40c from one direction above the liquid oscillating chamber 40c. Therefore, the flow speed on the upper side in the liquid oscillating chamber 40c increases, thereby strongly oscillating the liquid and allowing generation of a strong surface wave on the jet liquid column J. Thus, as shown in FIG. 5B, the sufficiently strong surface wave can be provided without causing a laser beam to strike the flow contracting portion C, and the jet liquid column J having struck the workpiece W can be sufficiently atomized by just oscillation with the liquid oscillating chamber 40c.

Next, referring to FIG. 7, a laser machining apparatus according to a third embodiment of the present invention will be described. The laser machining apparatus of this embodiment differs from that of the above-described first embodiment in a workpiece holder for holding the workpiece W. Therefore, only the differences between these embodiments will be described hereinafter, and the description of the same construction, operation, and advantages will not be repeated.

Figure 7:
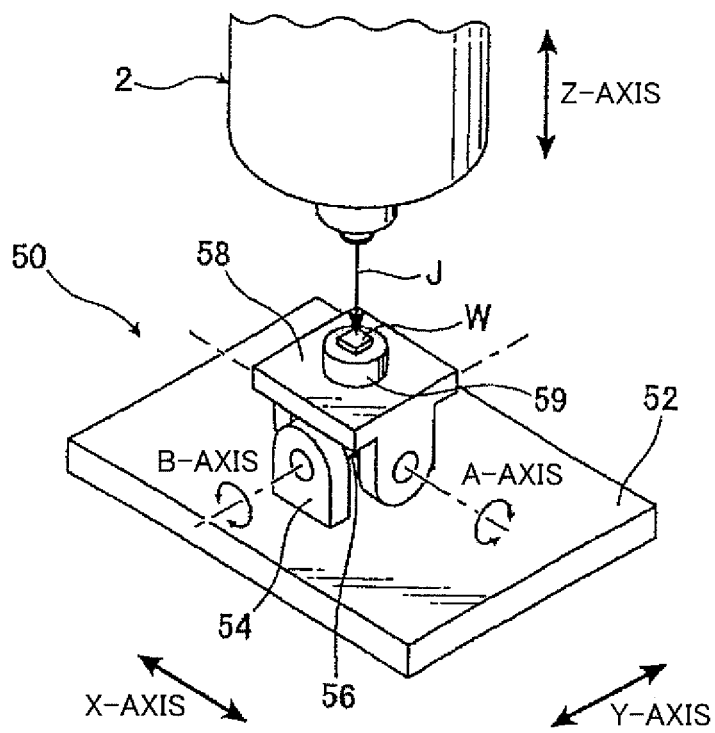
FIG. 7 illustrates a laser machining apparatus according to a third embodiment of the present invention.

As shown in FIG. 7, the laser machining apparatus of this embodiment includes a workpiece holder 50 that is disposed below the laser machining head 2. The workpiece holder 50 has an XY table 52, a bearing 54 provided on the XY table 52, a joint cross 56 supported by the bearing 54, a tilting rotary table 58 supported by the joint cross 56, and a clamp 59 for fixing the workpiece W to the tilting rotary table 58.

The XY table 52 can be translated in the directions of X- and Y-axes perpendicular to each other in the horizontal plane. The bearing 54 is fixed on the XY table 52 and supports the joint cross 56 rotatably about an axis (B-axis) parallel to the YX table 52. The joint cross 56 is a cross-like shaft that is composed of an integrated combination of a first shaft rotatably supported by the bearing 54 and a second shaft perpendicular to the first shaft. Also, the first shaft of the joint cross 56 is parallel to the direction of the Y-axis.

The tilting rotary table 58 is rotatably attached to the second shaft of the joint cross 56. The tilting rotary table 58 is rotatable about the second shaft (A-axis) of the joint cross 56. Also, the second shaft of the joint cross 56 is parallel to the direction of the X-axis. The clamp 59 is provided on the tilting rotary table 58 for removably fixing the workpiece W to the tilting rotary table 58. Also, the laser machining head 2 can be vertically translated.

The laser machining apparatus of this embodiment allows the workpiece W to be translated in the directions of the X- and Y-axes during machining and rotate about the A- and B-axes, and can perform the translation and rotation simultaneously. Thus, the workpiece W can be moved with a high degree of flexibility in three-dimensional space, thereby allowing a very wide range of machining and an increase in machining accuracy. Also, with the laser machining apparatus of this embodiment, accumulation of liquid in the vicinity of the machining point can be suppressed by moving the workpiece W during machining.

Next, referring to FIG. 8, a laser machining apparatus according to a fourth embodiment of the present invention will be described. The laser machining apparatus of this embodiment differs from that of the above-described first embodiment in a workpiece holder for holding the workpiece W. Therefore, only the differences between these embodiments will be described hereinafter, and the description of the same construction, operation, and advantages will not be repeated.

Figure 8:
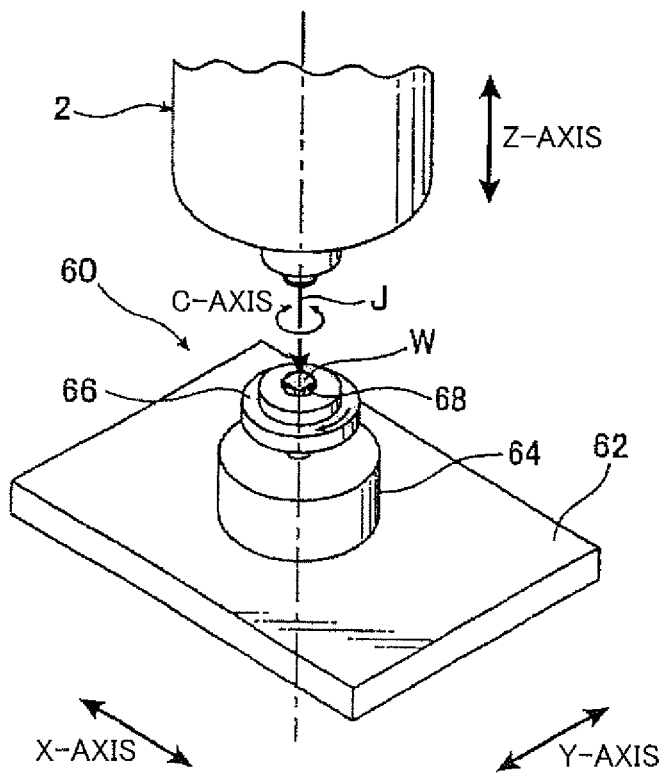
FIG. 8 illustrates a laser machining apparatus according to a fourth embodiment of the present invention.

As shown in FIG. 8, the laser machining apparatus of this embodiment includes a workpiece holder 60 that is disposed below the laser machining head 2. The workpiece holder 60 has an XY table 62, a rotary drive unit 64 provided on the XY table 62, a rotary table 66 supported by the rotary drive unit 64, and a clamp 68 for fixing the workpiece W to the rotary table 66.

The rotary drive unit 64 is a motor provided on the XY table 62 to rotatably drive the rotary table 66. The rotary table 66 is rotated about a vertical axis (C-axis) by the rotary drive unit 64. The clamp 68 is provided on the rotary table 66 for removably fixing the workpiece W to the rotary table 66. The laser machining head 2 can be translated in the direction of a Z-axis. Also, the laser machining head 2 may be constructed to be tiltable with respect to the direction of the Z-axis.

The laser machining apparatus of this embodiment allows the workpiece W to be translated in the directions of the X- and Y-axes during machining and rotate, and can perform the translation and rotation simultaneously. The laser machining apparatus of this embodiment allows flexible machining in three-dimensional space, and further facilitates control of the workpiece holder relative to the laser machining apparatus according to the above-mentioned third embodiment, thereby allowing the workpiece W to move faster. Also, taper machining can be applied to the workpiece W by tilting the laser machining head 2 with respect to the workpiece W. Furthermore, with the laser machining apparatus of this embodiment, accumulation of liquid in the vicinity of the machining point can be further suppressed by rotating the workpiece W at high speed during machining.

Figure 9:
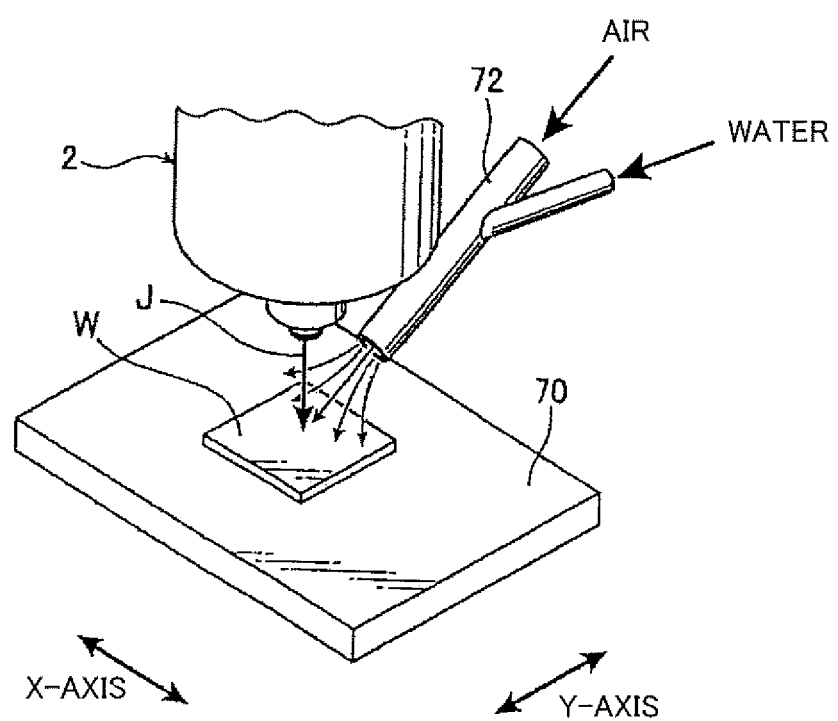
FIG. 9 illustrates a laser machining apparatus according to a fifth embodiment of the present invention.

Next, referring to FIG. 9, a laser machining apparatus according to a fifth embodiment of the present invention will be described. The laser machining apparatus of this embodiment differs from that of the above-described first embodiment in that a mist jet injector for directing a mist jet at a machining point on the workpiece W is provided. Therefore, only the differences between these embodiments will be described hereinafter, and the description of the same construction, operation, and advantages will not be repeated. As shown in FIG. 9, the laser machining apparatus of this embodiment has an XY table 70 that is disposed below the laser machining head 2, and a mist jet injector 72 that directs a mist jet at a machining point on the workpiece W on the XY table 70.

The XY table 70 can be translated in the directions of X- and Y-axes perpendicular to each other in the horizontal plane. The mist jet injector 72 atomizes water with high-speed airflow to direct a mist jet at the machining point on the workpiece W. The mist jet removes machining dust generated by machining of the workpiece W from the machining point. Thus, residues on the surface of the workpiece W can be eliminated.

Next, referring to FIGS. 10 to 13C, a laser machining apparatus according to a sixth embodiment of the present invention will be described. The laser machining apparatus of this embodiment differs from that of the above-described first embodiment in the forms of a liquid oscillating chamber, an oscillating chamber inlet path, and an oscillating chamber inlet port. Therefore, only the differences between these embodiments will be described hereinafter, and the description of the same construction, operation, and advantages will not be repeated.

Figure 10:
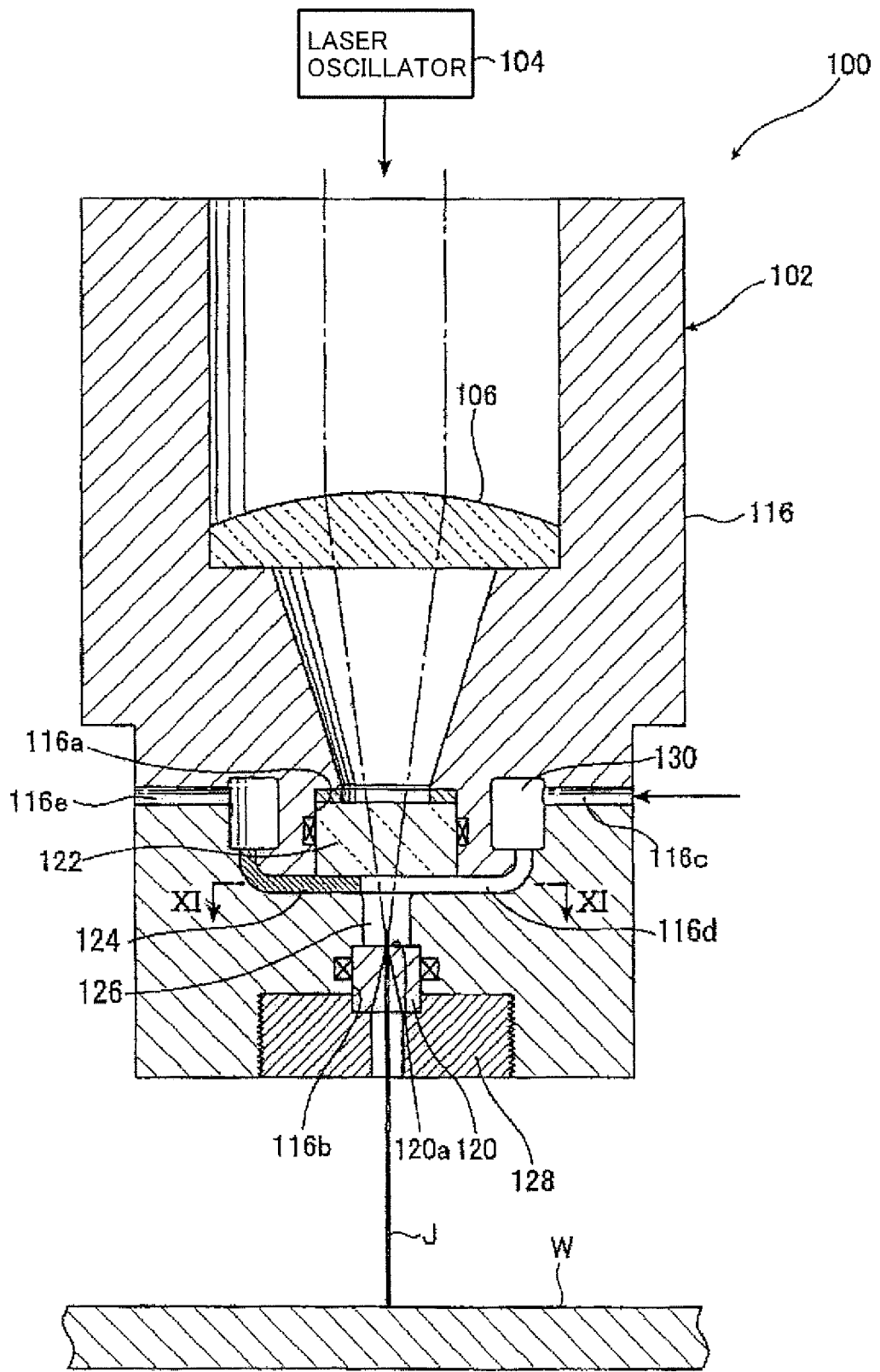
FIG. 10 is a sectional view of a head of a laser machining apparatus according to a sixth embodiment of the present invention.

As shown in FIG. 10, a laser machining apparatus 100 according to the sixth embodiment of the present invention has a laser machining head 102, a laser oscillator 104 for transmitting a laser beam to the laser machining head 102, and a focusing optical system 106 for focusing the laser beam transmitted from the laser oscillator 104. Also, water is supplied to the laser machining head 102 from a liquid supply source (not shown) through a liquid processor, a high-pressure pump, and a high-pressure filter (which are not shown). Furthermore, as shown in FIG. 10, the laser machining head 102 has a head body 116, a nozzle 120, a window 122, and an oscillating chamber inlet path adjusting member 124.

The oscillating chamber inlet path adjusting member 124 is disposed below the window 122. The oscillating chamber inlet path adjusting member 124 is built in the head body 116. The window 122 is fixed in such a manner as to be held between the oscillating chamber inlet path adjusting member 124 and a window receiving recess 116a (see FIG. 10).

A circular tray-shaped space extending downward from an annular rectifying chamber 130 is formed within the head body 116. The oscillating chamber inlet path adjusting member 124 is disposed within the space, thereby defining the form of an oscillating chamber inlet path 116d. Also, the head body 116 is formed with a cylindrical bore extending downward from the center of the circular tray-shaped space, the inside of the bore serving as a liquid oscillating chamber 126.

Also, as shown in FIG. 10, an air-bleeding path 116e is formed on the opposite side of a liquid feed path 116c. The air-bleeding path 116e extends substantially horizontally on the opposite side of the liquid feed path 116c. The air-bleeding path 116e is a path for discharging accumulated air in the rectifying chamber 130 or the like at the time of initial use of the laser machining apparatus 100 and is closed by a valve (not shown) at the time of actual use of the laser machining apparatus 100.

Next, referring to FIGS. 11 and 12, the structures of the liquid oscillating chamber 126 and the oscillating chamber inlet path 116d will be described in detail. FIG. 12 is a perspective view three-dimensionally illustrating the forms of the liquid oscillating chamber 126, the oscillating chamber inlet path 116d, and the rectifying chamber 130 which are formed as cavities within the head body 116.

Figure 11:
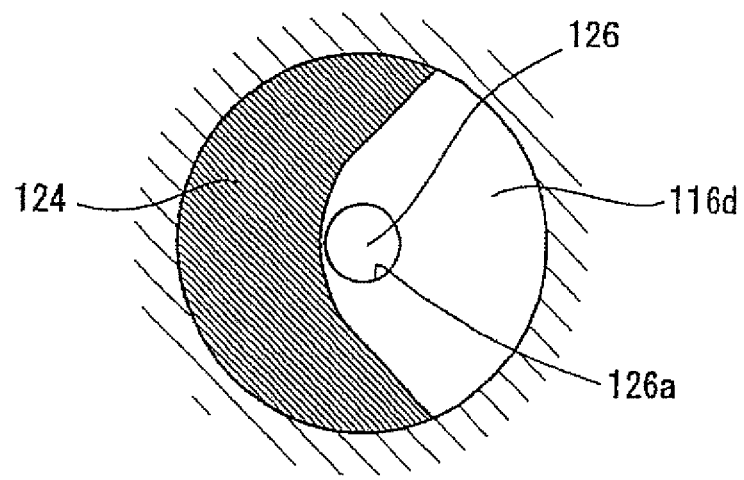
FIG. 11 is a perspective view illustrating a section taken along line XI-XI of FIG. 10.
Figure 12:
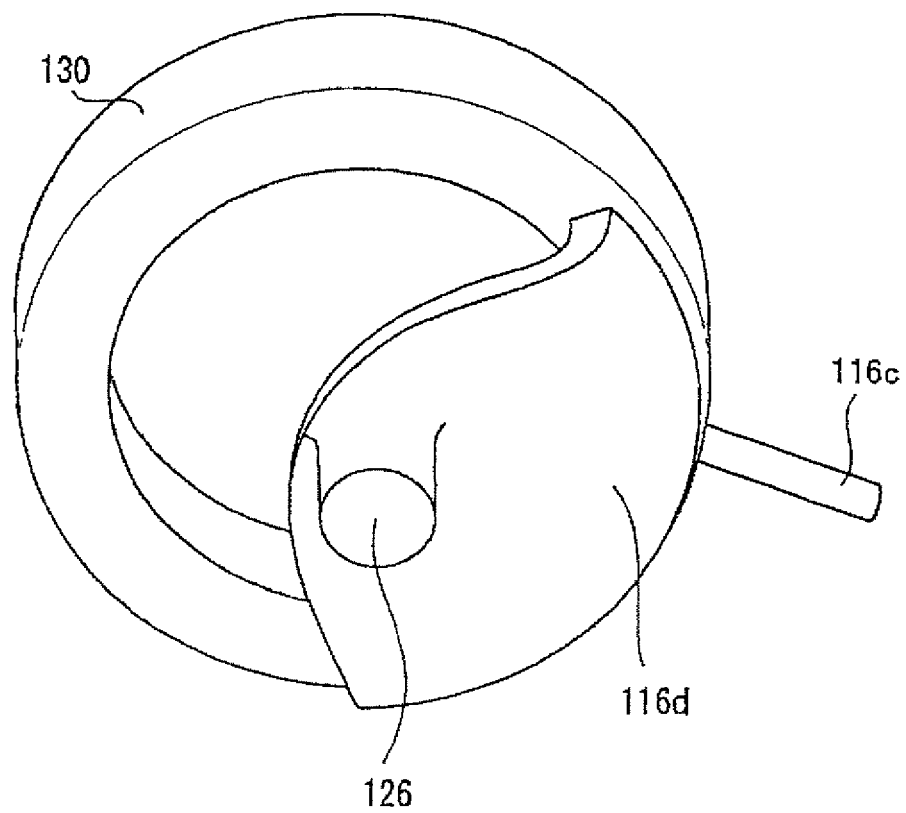
FIG. 12 is a perspective view illustrating the forms of a liquid oscillating chamber, an oscillating chamber inlet path, and a rectifying chamber which are formed within the head of the laser machining apparatus.

As shown in FIG. 11, the oscillating chamber inlet path adjusting member 124 is shaped to conform to the circular tray-shaped space formed within the head body 116. The oscillating chamber inlet path adjusting member 124 has a shape in which a fan-shaped portion with a central angle of approximately 90° is cut away from the circular tray shape. The oscillating chamber inlet path adjusting member 124 is disposed within the circular tray-shaped space formed within the head body 116, and thus the remaining space serves as the oscillating chamber inlet path 116d. In other words, as shown in FIG. 12, a portion of the circular tray-shaped space formed so as to communicate with the annular rectifying chamber 130 is closed by the oscillating chamber inlet path adjusting member 124, thereby forming the oscillating chamber inlet path 116d extending horizontally and having the fan shape with an angle of approximately 90°.

Furthermore, the cylindrical liquid oscillating chamber 126 is formed in a manner communicating with the oscillating chamber inlet path 116d. The liquid oscillating chamber 126 is formed in a downwardly extending manner on the central axis of the annular rectifying chamber 130. Also, as shown in FIG. 10, the sidewall of the liquid oscillating chamber 126 is constructed of the inner peripheral surface of the cylindrical bore formed within the head body 116. The bottom of the liquid oscillating chamber 126 is constructed of the top end surface of the nozzle 20. Also, the top end of the liquid oscillating chamber 126 communicates with the oscillating chamber inlet path 116d through a circular oscillating chamber inlet port 126a. Thus, supplied liquid flows along the window 122 through the oscillating chamber inlet path 116d from one side of the liquid oscillating chamber 126 and passes through the oscillating chamber inlet port 126a into the liquid oscillating chamber 126.

It should noted that, in this embodiment, the liquid oscillating chamber 126 is about 4.2 mm in diameter and about 4.5 mm in height, and has a cylindrical shape with a height greater than the diameter. Also, the approximately-fan-shaped oscillating chamber inlet path 116d is about 1.5 mm in height. The distance from the top end surface of the nozzle 120 to the lower end surface of the window 122 is about 6 mm. Preferably, the liquid oscillating chamber 126 has a height in the range of from 20 to 300 times the diameter of the nozzle hole (the nozzle inlet opening) and a diameter in the range of from 15 to 200 times the diameter of the nozzle hole (the nozzle inlet opening), the height of the liquid oscillating chamber 126 being set to be greater than the width.

Also in this embodiment, in the same manner as the first embodiment, the surface wave 32 can be increased by giving a disturbance to the jet liquid column J with a laser beam (see FIG. 5). Thus, the jet liquid column J is more immediately atomized after reaching the workpiece W.

Furthermore, also in the laser machining apparatus 100 of this embodiment, it is possible to suppress the attachment of dirt, oil, etc. in the liquid to the window surface which causes a disturbance in light guiding. It should be noted that, in the laser machining apparatus 100 of this embodiment, a portion of the top end surface of the oscillating chamber inlet path 116d is constructed of the lower end surface of the window 122, and the liquid flows along the surface of the window 122. Thus, the surface of the window 122 can be more effectively washed out, and attachment of impurities can be more reliably prevented.

Figure 13A:
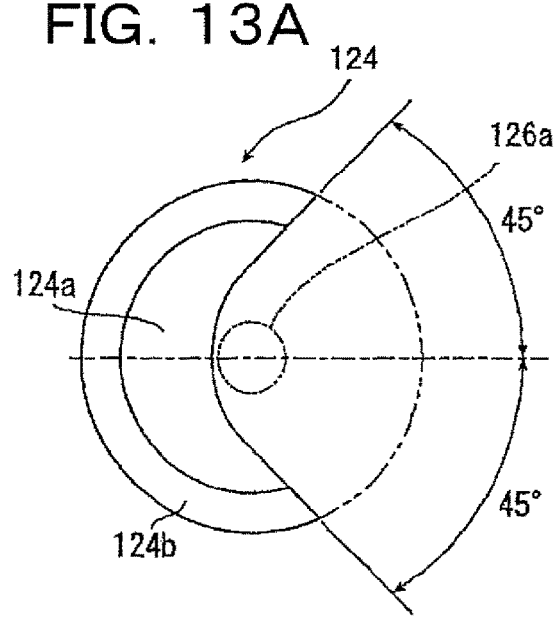
FIGS. 13A to 13C are plan views of oscillating chamber inlet path adjusting members according to the sixth embodiment, a first modification, and a second modification of the present invention.
Figure 13B:
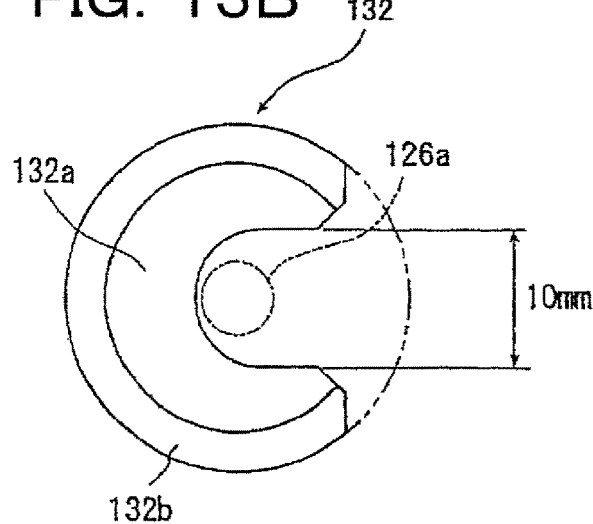
Figure 13C:
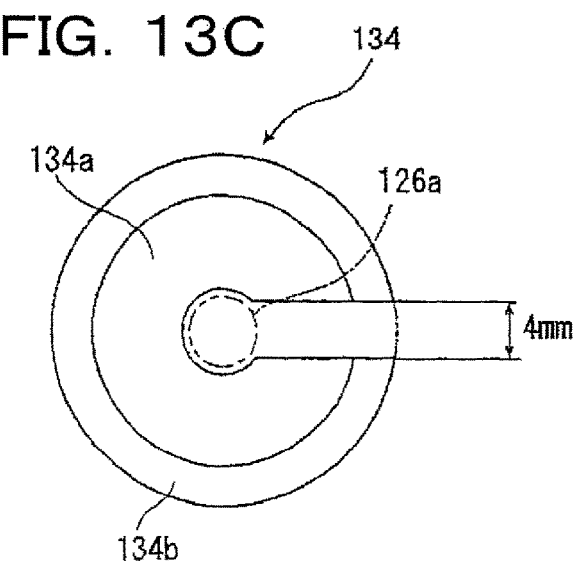

Next, referring to FIGS. 13A to 13C, modifications of the oscillating chamber inlet path adjusting member 124 will be described. FIG. 13A is a plan view of the oscillating chamber inlet path adjusting member 124 according to the sixth embodiment of the present invention. FIGS. 13B and 13C are plan views of oscillating chamber inlet path adjusting members according to the modifications.

As shown in FIG. 13A, the oscillating chamber inlet path adjusting member 124 is a member for closing a portion of the circular tray-shaped space formed within the head body 116, and has a bottom 124a and an edge 124b that upstands from the edge of the bottom 124a. The bottom 124a and the edge 124b are provided with a generally fan-shaped notch with a central angle of approximately 90°, the notch serving as the oscillating chamber inlet path 116d. Also, a central angle portion of the fan-shaped notch is rounded along an arc with a radius of about 10 mm. It should be noted that FIG. 13A shows, by a phantom line, the position of the oscillating chamber inlet port 126a with respect to the oscillating chamber inlet path adjusting member 124.

FIG. 13B illustrates a first modification of the oscillating chamber inlet path adjusting member 124. An oscillating chamber inlet path adjusting member 132 according to the first modification has a bottom 132a and an edge 132b. The bottom 132a and the edge 132b are each provided with a notch. The notch provided in the bottom 132a is about 10 mm in width and extends radially to form the oscillating chamber inlet path 116d to the oscillating chamber inlet port 126a.

FIG. 13C illustrates a second modification of the oscillating chamber inlet path adjusting member 124. An oscillating chamber inlet path adjusting member 134 according to the second modification has a bottom 134a and an edge 134b. The bottom 134a and the edge 134b are each provided with a radially-extending notch with a width of about 4 mm.

In the case where the oscillating chamber inlet path adjusting members 132 and 134 according to the first and second modifications are used, the oscillating chamber inlet path 116d becomes narrower relative to the case where the oscillating chamber inlet path adjusting member 124 of the sixth embodiment is used, so that the jet liquid column J is more strongly oscillated and the surface wave 32 increases. Therefore, in the laser machining apparatus 100 according to the sixth embodiment in which the oscillating chamber inlet path adjusting member 124 shown in FIG. 13A is used, the jet liquid column J is held over a length of about 48 mm. On the other hand, in the first modification, the liquid column J breaks down into liquid masses 36 at a length of about 42 mm, while in the second modification the liquid column J breaks down into liquid masses 36 at a length of about 28 mm.

Preferably, the oscillating chamber inlet path adjusting members are changed depending on the uses of the laser machining apparatus or objects to be machined. More specifically, if the object to be machined is a thin plate or the like which can be cut by one scanning of the jet liquid column J, the oscillating chamber inlet path adjusting member 124 (FIG. 13A) is used. Thus, the jet liquid column J is held over a long distance, and therefore the distance between the object to be machined and the laser machining head can be set larger.

Alternatively, if the object to be machined is a thick plate or the like which requires multiple scanning of the jet liquid column J in order for the completion of cutting, the oscillating chamber inlet path adjusting member 132 (FIG. 13B) or 134 (FIG. 13C) is used. Thus, the jet liquid column J becomes likely to be immediately atomized after striking the object to be machined. Consequently, even in the state where the machining point is not pierced, liquid becomes less likely to be accumulated in a groove formed by machining, and a disturbance in light guiding due to the accumulated liquid can be suppressed.

Although preferred embodiments of the present invention have been described above, it should be understood that various changes may be made to the above-described embodiments. In particular, the present invention may be constructed by arbitrary combination of the structures included in the above-described embodiments. Also, in the above-described embodiments, the head body is an integral member, however, may be arbitrarily separated into plural members. Furthermore, by the combination of the above-described third and fourth embodiments, the present invention may be constructed such that a rotary table is provided on the tilting rotary table.

What is claimed is:

1. A laser machining apparatus for machining with a laser beam that is guided to a machining point by a liquid, comprising:
   a laser oscillator generating a laser beam;
   a nozzle including a nozzle inlet opening, the nozzle jetting a jet liquid column;
   a rectifying chamber having an annular shape, the rectifying chamber attenuating disturbances in flow of the liquid;
   a liquid oscillating chamber having a generally cylindrical shape with a height greater than its diameter, the liquid oscillating chamber guiding the liquid to the nozzle inlet opening;
   a focusing optical system focusing the laser beam generated by the laser oscillator above the nozzle inlet opening to cause the jet liquid column to guide the laser beam;
   a window opposed the nozzle inlet opening to cause the laser beam transmitting from the focusing optical system to enter the liquid oscillating chamber, the focusing optical system focusing the laser beam generated by the laser oscillator above the nozzle inlet opening to cause the jet liquid column to guide the laser beam;
   a circular tray-shaped space extending downward from the rectifying chamber, the circular tray-shaped space extending below the window, the circular tray-shaped space communicating the rectifying chamber to the liquid oscillating chamber;
   an oscillating chamber inlet path adjusting member shaped to conform to the circular tray-shaped space, the oscillating chamber inlet path adjusting member having a fan shape, the oscillating chamber inlet path adjusting member closing a portion of the circular tray-shaped space;
   an oscillating chamber inlet path communicating the rectifying chamber to the liquid oscillating chamber, the oscillating chamber inlet path extending horizontally and having a shape of a sector of a circle with a central angle of substantially 90 degrees, the oscillating chamber inlet path formed by the circular tray-shaped space and the oscillating chamber inlet path adjusting member; and wherein the liquid oscillating chamber increases a surface wave on an outer surface of the jet liquid column to cause the jet liquid column jetted from the nozzle onto a workpiece to be easily atomized at the machining point.

* * * * *